Dec. 11, 1923.
J. W. BISHOP
MOTOR
Filed Sept. 29, 1921   3 Sheets-Sheet 1
1,476,683
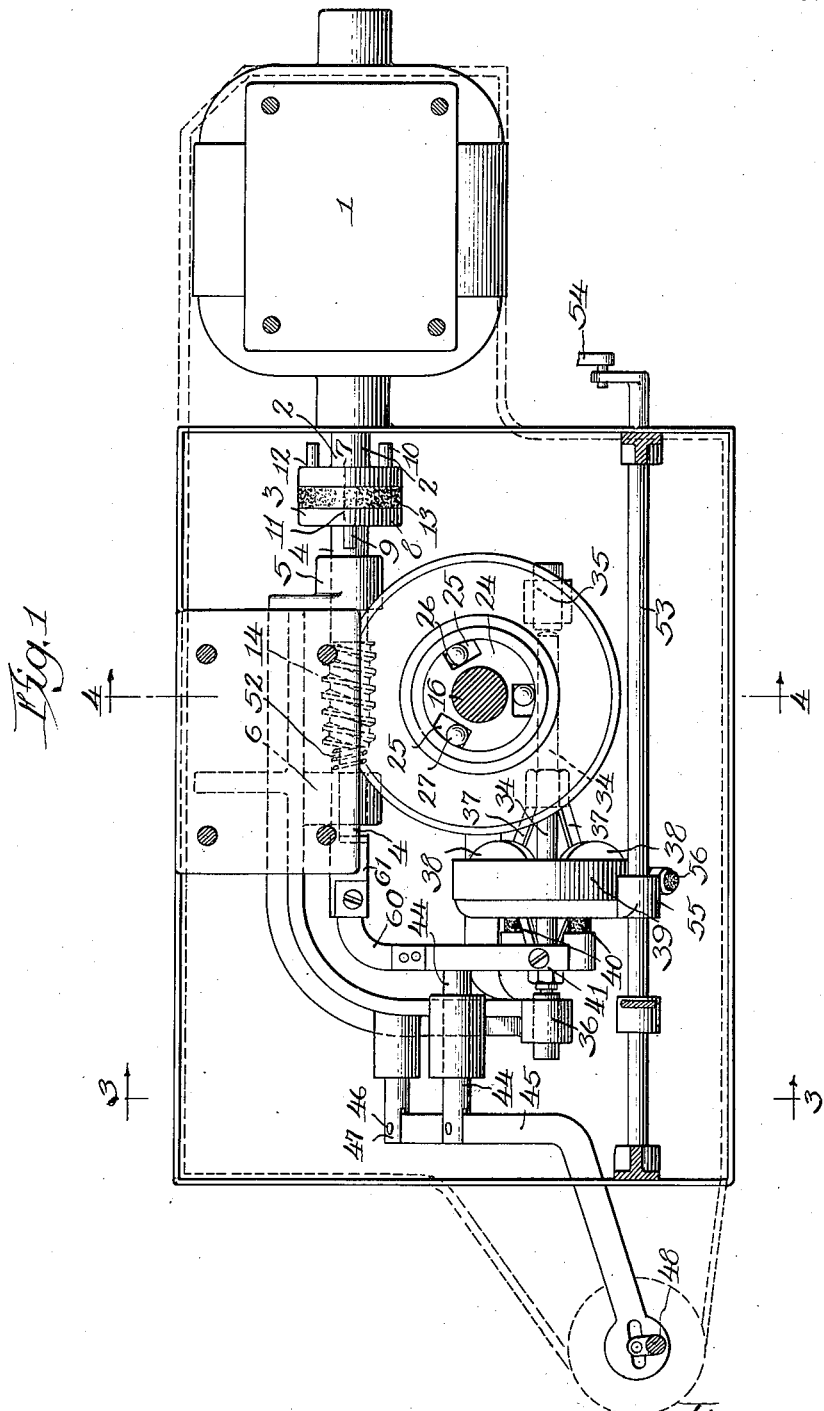

Dec. 11, 1923.  
J. W. BISHOP  
MOTOR  
Filed Sept. 29, 1921  
1,476,683  
3 Sheets-Sheet 2
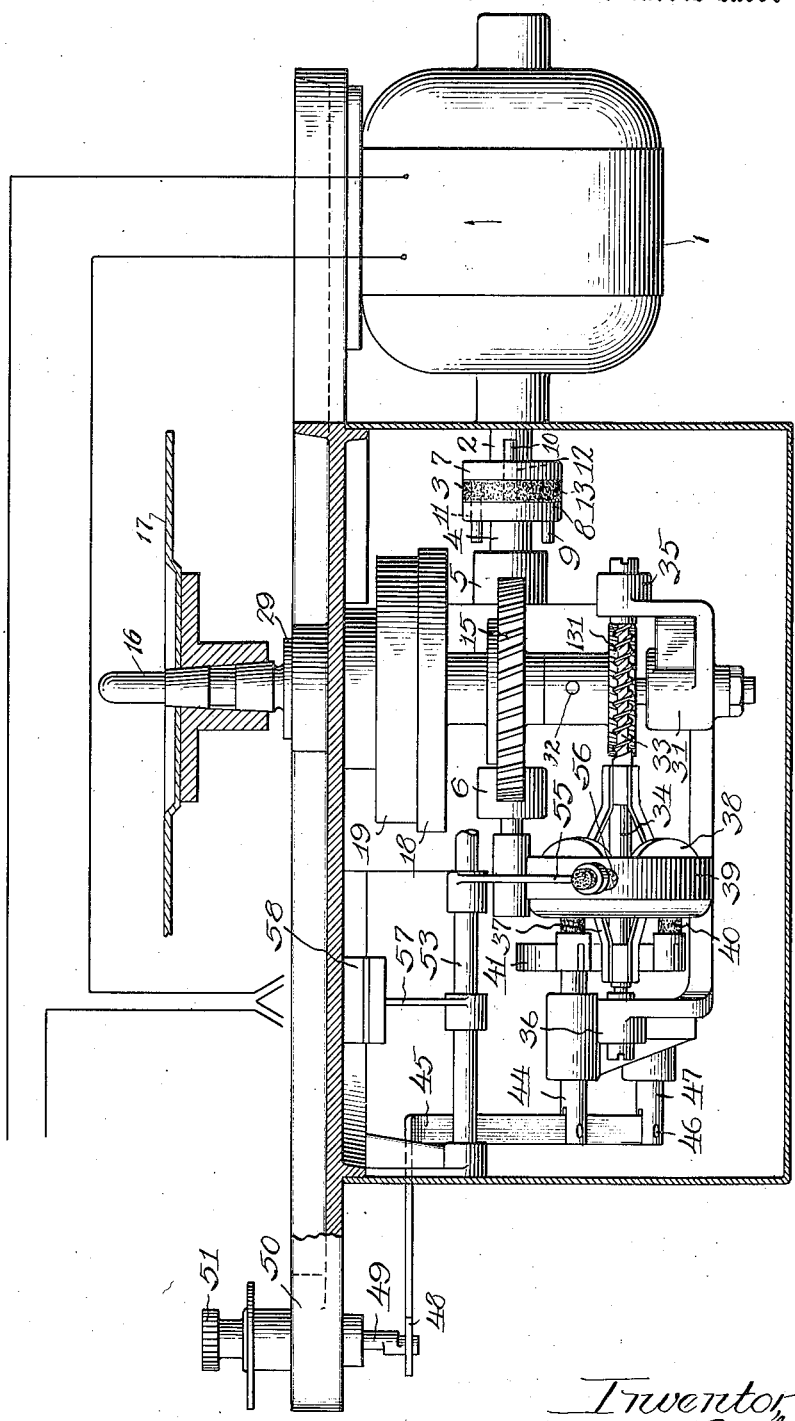

Dec. 11, 1923.

J. W. BISHOP

MOTOR

Filed Sept. 29, 1921    3 Sheets-Sheet 3

1,476,683

Inventor,
Joseph W. Bishop
By Wm O Bell Atty.

Patented Dec. 11, 1923.

1,476,683

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

MOTOR.

Application filed September 29, 1921. Serial No. 504,096.

*To all whom it may concern:*

Be it known that I, JOSEPH W. BISHOP, a citizen of the United States, residing at Muskegon, in the county of Muskegon and State of Michigan, have invented certain new and useful Improvements in Motors, of which the following is a specification.

This invention relates to phonographs and has for its principal object to provide mechanism whereby the turn table may be driven at a constant speed by a motor having a variable speed.

Another and a more specific object of the invention is to provide means enabling an electric motor whose speed varies with the fluctations in the line to drive the table of the phonograph at a constant speed.

Further objects of the invention will become apparent as the description is read in connection with the accompanying drawing wherein I have shown a selected embodiment by way of illustration and in which—

Fig. 1 is a plan view of the device with the upper portion of the housing removed;

Fig. 2 is a longitudinal section of the casing showing the mechanism in side elevation;

Figure 4:
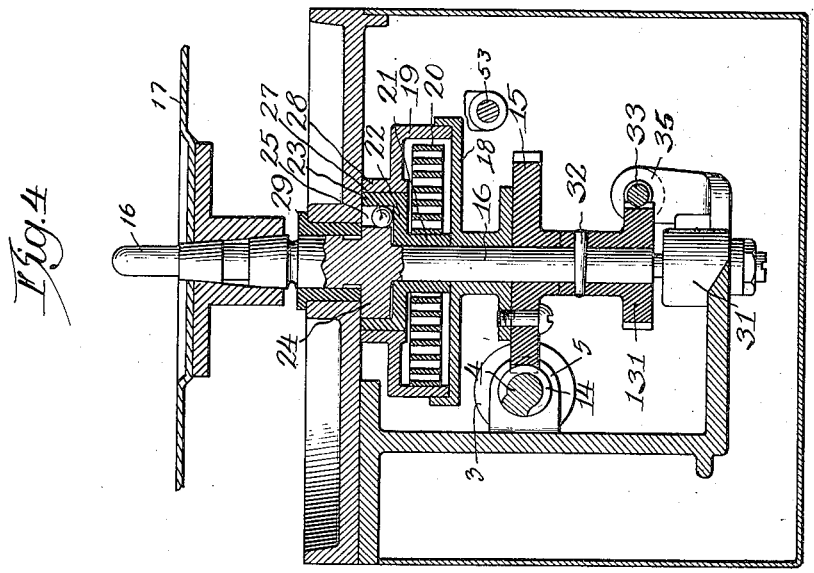
Figure 3:
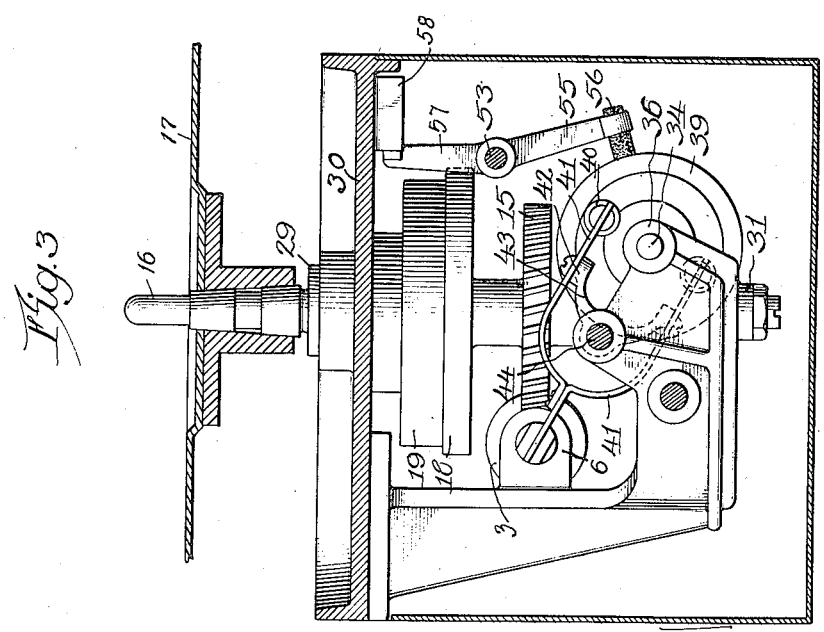

Figs. 3 and 4 are transverse sections on the lines 3—3 and 4—4 respectively of Fig. 1.

Referring to the reference characters, 1 indicates a prime mover here shown as an electric motor. The shaft 2 of the motor is connected by a sliding coupling 3 with a worm shaft 4 journalled in the bearings 5 and 6. The coupling 3 may consist of flanges 7 and 8 equipped with the pins 9 and 10 respectively, passing through the corresponding openings 11 and 12. A disc of suitable cushioning material 13 is interposed between the two flanges 7 and 8. The worm 14 carried by the shaft 4 meshes with the worm gear 15 loosely mounted on the spindle 16 which is adapted to carry the table 17. As is shown, the worm gear is secured to one piece 18 of the spring housing, the other piece 19 of which is secured to the outer end of a spiral spring 20. The inner end of this spring is fastened to the bushing 21 having a disc-shaped portion 22, and a cylindrical flange 23 at the outer edge thereof. Within this short cylinder 23 is a collar 24 on the spindle 16, said collar being provided with the notches 25 having inclined walls 26 between which and the inner wall of the cylinder 23, the balls or rollers 27 are adapted to be wedged when the bushing is rotated. The upper portion 19 of the spring housing may be equipped with a cylindrical extension 28 telescoping with the cylindrical flange 23 to make a dust-tight closure for the spring. The function of the spring 20 is to absorb extra impulses due to a rise in the voltage of the line which supplies electrical energy to the motor and to furnish sufficient torque to drive the spindle while the parts are readjusting when the line drops to normal. The spindle 16 is journalled in the bushing 29 carried by the frame 30 and has at its lower end a thrust bearing 31 which may be of any suitable form. Below the gear 15 is a similar worm gear 131 secured to the spindle 16 by the key 32 or any other suitable manner; and meshing with this worm gear is the worm 33 carried by the governor shaft 34 mounted in suitable bearings 35 and 36 in the frame. As illustrated, the governor is of the familiar centrifugal type having the springs 37 and weights 38, and is equipped with a brake drum 39 adapted to move to the left in Fig. 1 as the speed of the spindle increases and bear against the brake pads 40 carried by the yoke 41 pivoted at 42 on the bow 43 connected to the pushrod 44 which is pivoted to the lever 45. This lever 45 is pivoted at 46 on the post 47 extending outward upon a frame, and has its opposite ends engaged with an eccentric or other device 48 on the shaft 49 journaled in the frame at 50 and having a knob 51 at its upper end. By turning the knob 51 the brake pads 40 may be moved either to the right or to the left in Fig. 1 to adjust them to correspond to a suitable maximum speed of the spindle.

The worm 14 in driving the worm gear 15 has a tendency to move to the left in Fig. 1, and I propose to take advantage of this tendency to compensate for an increase in speed in the motor. I mount the worm shaft 4 so as to be freely movable longitudinally in the bearings 5 and 6 and provide the yoke 41 with an arm 60 and a pivoted socket 61 adapted to receive the end of the shaft 4. In this way, when the motor accelerates, the extra torque given the worm will cause it to move to the left and swing the yoke 41 about its pivots 42 and press the brake pads 40 against the brake drum 39 to increase the load on the motor to correspond to the increase in the torque, that produced the acceleration in speed. I rely upon the adjustment of the pads 40 given by turning the knob 51 to govern the speed of the table for ordinary conditions and depend upon the thrust of the worm 14 to make the additional correction necessary to compensate for an increase in the voltage in the line, for instance.

I prefer to provide a spring 52 of sufficient strength to take the normal thrust of the worm 14, but weak enough to yield to abnormal pressure from the worm and permit the shaft 4 to move to the left and operate the brake as above indicated. This spring may be applied anywhere suitable.

For stopping and starting the machine I provide a shaft 53 mounted in the bearings in the frame and connected with a control lever 54 extending above the motor board. This shaft carries an arm 55 equipped with a brake pad 56 adapted to bear on the drum 39 and hold the spindle 16 stationary. Another arm 57 on this shaft operates a switch 58 in the circuit of the electric motor 1. The arrangement is such that when the control lever 54 has moved to lift the brake 56 from the drum 39, the switch 58 is closed and a reverse movement applies the brake and opens the switch.

In operation the motor 1 drives the shaft 4 through the sliding coupling 3 and the worm 14 carried by the shaft 4 transmits the power to the spindle 16 through the worm gear 15, the spring 20 and the overrunning clutch described. The worm gear 131 carried by the spindle 16 drives the governor. By turning the knob 51 the brake pads 40 may be set to limit the speed of the spindle 16 to the desired maximum.

For all the action of the worm 14 in driving the worm wheel 15 there is a corresponding reaction tending to move the worm to the left in Fig. 1 against the resistance of the spring 52. Consequently, when the motor picks up and communicates an increased torque to the worm 14 the brake pads 40 are pressed against the drum 39 to a degree corresponding to the increased torque transmitted to the worm gear 14 and no appreciable increase in speed of the spindle 16 results. The spring 20 is of sufficient capacity to absorb these extra impulses due to a rise in the line, and to furnish sufficient torque to drive the spindle while the parts are readjusting when the line drops to normal.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims:

I claim:

1. In a device of the class desribed, a rotating table, a spindle on which said table is mounted, a brake adapted to retard the rotation of the spindle, a motor, means for transmitting the drive of the motor to the spindle and adapted to apply the brake when the motor speed reaches a desired maximum, and separate means for adjusting the brake.

2. In a device of the class described, a rotating table, a spindle on which said table is mounted, a motor, transmission gearing between the motor and the spindle, a brake connected with the spindle, means operated by the transmission for applying the brake, and separate means for adjusting the brake.

3. In a device of the class described, a motor, a spindle, transmission gearing between the motor and the spindle, a brake connected with the spindle, one element of said transmission gearing being movable under extraordinary motor speed to apply the brake, and separate means for adjusting the brake.

4. In a device of the class described, a motor, a spindle driven thereby, a transmission between the spindle and the motor, including a worm adapted to have a limited movement in the direction of its thrust, a brake connected with the spindle, means operated by movement of said worm for applying said brake, and separate means for adjusting the brake.

5. In a device of the class described, a motor, a spindle, a transmission between said motor and spindle including a worm adapted to have a limited longitudinal movement, a brake adapted to retard the rotation of said spindle, means normally holding the worm against longitudinal movement, means operated by the longitudinal movement of the worm for applying said brake, and separate means for adjusting the brake.

6. In a device of the class described, a spindle, a worm gear connected therewith, a worm meshing with said worm gear adapted to have a limited longitudinal movement, a motor driving said worm, a brake connected with said spindle, means operated by a thrust of said worm for applying the brake, and separate means for adjusting the brake.

7. In a device of the class described, a spindle, a spiral spring, a clutch between said spindle and said spring, a worm gear connected to said spring, a worm meshing with said worm gear and adapted to have a limited movement in the direction of its length, a governor connected with said spindle and including a brake, and means operated by the movement of the worm for applying the brakes.

8. In a device of the class described, a motor, a spindle, a worm driven by the motor, a worm gear meshing with the worm, a spring interposed between the worm gear and the spindle, a brake connected with the spindle, said worm being mounted to permit a limited longitudinal movement, a spring to resist the longitudinal movement of the worm, and means operated by a movement of the worm for applying said brake.

9. In a device of the class described, a spindle, a worm gear connected therewith, a worm meshing with said worm gear and adapted to have a limited longitudinal movement, a spring to resist longitudinal movement of the worm, a motor driving said worm, a brake connected with said spindle, means operated by a thrust of said worm for applying the brake, and separate means for adjusting the brake.

10. In a device of the class described, a spindle, a motor, transmission gearing between the motor and the spindle, a brake member connected to the spindle, a movable support, a lever pivoted to the movable support and adapted to be angularly displaced by the transmission gearing when the motor speed reaches a predetermined maximum, a second brake member carried by the lever and adapted to operatively engage the first brake member, and means for holding the movable support in a plurality of adjusted positions relative to the first brake member.

11. In a device of the class described, a spindle, a motor, a worm driven by the motor and adapted to have a limited longitudinal movement, yielding means for resisting movement of the worm in one direction, a worm gear meshing with the worm, a spindle driven by the worm gear, a governor connected to the spindle and including a brake element, a movable support, a lever pivoted to the movable support and adapted to be angularly displaced by longitudinal movement of the worm, a second brake element carried by the lever and adapted to operatively engage the first brake element, and means for holding the movable support in a plurality of adjusted positions relative to the first brake element.

12. In a device of the class described a spindle, a motor, a worm driven by the motor and adapted to have a limited longitudinal movement, yielding means for resisting movement of the worm in one direction, a worm gear meshing with the worm, a spindle driven by the worm gear, a governor connected to the spindle and including a brake element, a support, a lever pivoted to the support and adapted to be angularly displaced by longitudinal movement of the worm, and a second brake element carried by the lever and adapted to operatively engage the first brake element.

JOSEPH W. BISHOP.